United States Patent
Noguchi et al.

(10) Patent No.: US 7,301,786 B2
(45) Date of Patent: Nov. 27, 2007

(54) QUASI RESONANT TYPE SWITCHING POWER SUPPLY APPARATUS WITH OVERCURRENT LIMITING

(75) Inventors: Yasunari Noguchi, Gunma-ken (JP); Yoshio Fujimura, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 110 days.

(21) Appl. No.: 11/372,768

(22) Filed: Mar. 10, 2006

(65) Prior Publication Data
US 2006/0202562 A1 Sep. 14, 2006

(30) Foreign Application Priority Data
Mar. 10, 2005 (JP) ............... 2005-067373

(51) Int. Cl.
*H02M 3/335* (2006.01)
(52) U.S. Cl. ............... 363/21.03; 363/21.16; 363/56.1
(58) Field of Classification Search ............ 363/21.02, 363/21.03, 21.05, 21.08, 21.09, 21.13, 21.16, 363/21.17, 56.1
See application file for complete search history.

(56) References Cited

U.S. PATENT DOCUMENTS

| | | | | |
|---|---|---|---|---|
| 5,424,933 A | * | 6/1995 | Illingworth | 363/21.02 |
| 5,812,383 A | * | 9/1998 | Majid et al. | 363/21.05 |
| 5,986,897 A | * | 11/1999 | Majid et al. | 363/21.16 |
| 6,094,362 A | * | 7/2000 | Domingo | 363/56.1 |
| 6,788,556 B2 | * | 9/2004 | Hosotani et al. | 363/21.15 |
| 2003/0142514 A1 | * | 7/2003 | Hosotani et al. | 363/21.02 |
| 2007/0109820 A1 | * | 5/2007 | Yang et al. | 363/21.03 |

FOREIGN PATENT DOCUMENTS

| | | |
|---|---|---|
| JP | 4-299067 | 10/1992 |
| JP | 9-271168 | 10/1997 |
| JP | 2002-238255 | 8/2002 |
| JP | 2003-61345 | 2/2003 |

OTHER PUBLICATIONS

English Patent Abstract of JP 4-299067 from esp@cenet, published Oct. 22, 1992 (1 page).
English Patent Abstract of JP 9-271168 from esp@cenet, published Oct. 14, 1997 (1 page).
English Patent Abstract of JP 2002-238255 from esp@cenet, published Aug. 23, 2002 (1 page).
English Patent Abstract of JP 2003-061345 from esp@cenet, published Feb. 28, 2003 (1 page).

* cited by examiner

*Primary Examiner*—Jeffrey Sterrett
(74) *Attorney, Agent, or Firm*—Osha Liang LLP

(57) ABSTRACT

A quasi resonant type switching power supplying unit includes an overcurrent limiting circuit and an oscillation level comparison circuit. The overcurrent limiting circuit (i.e., a level determining circuit and a reference voltage generating circuit) receives a reverse electromotive voltage generated from an auxiliary winding which is electromagnetically connected with a primary winding when a MOSFET is in an OFF state, and produces a reference voltage stepwise based on the reverse electromotive voltage. The oscillation level comparison circuit receives a feedback voltage corresponding to electric power supplied to a load, and produces a control signal that switches the MOSFET into an OFF state when the feedback voltage exceeds the reference voltage.

11 Claims, 7 Drawing Sheets

US 7,301,786 B2

QUASI RESONANT TYPE SWITCHING POWER SUPPLY APPARATUS WITH OVERCURRENT LIMITING

CROSS-REFERENCE TO RELATED APPLICATION

The entire disclosure of Japanese Patent Application No. 2005-67373 filed on Mar. 10, 2005 including specification, claims, drawings, and abstract is incorporated herein by reference.

BACKGROUND OF THE INVENTION

1. Field of the Invention

The present invention relates to a quasi resonant type switching power supplying unit equipped with an overcurrent protection circuit.

2. Description of the Related Art

As shown in FIG. 7, a conventional quasi resonant type switching power supplying unit 100 includes an integrated circuit Q, a MOSFET 1, and a MOSFET 2 that are housed in a package P. The quasi resonant type switching power supplying unit 100 has a Vcc terminal T1, a TRG terminal T2, an FB terminal T3, a SOURCE terminal T4, a DRAIN terminal T5, and a VREF terminal T6. A source electrode of the MOSFET 1 is connected to the SOURCE terminal T4. A drain electrode of the MOSFET 1 is connected to the DRAIN terminal T5. The drain electrode of the MOSFET 1 is also connected to a drain electrode of the MOSFET 2.

In the integrated circuit Q, an oscillation circuit 3 generates a saw-like oscillation signal. When a charge control signal is input from a fixing circuit 4, a MOSFET 5 switches to an ON state and charges a capacitor C in the oscillation circuit 3. With this arrangement, the charge time of the capacitor C can be shortened. An oscillation edge circuit 8 converts the saw-like signal into a pulse signal and outputs the converted pulse signal to a latch circuit 9.

The fixing circuit 4 produces the charge control signal as a result of a logic operation applied to a trigger signal TRG and a frequency restriction signal. The trigger signal TRG is input from the trigger terminal T2 in response to a signal generated from an auxiliary winding of an external transducer. An edge detecting circuit 6 detects the trigger signal TRG. A signal of the oscillation circuit 3 is fed back to the fixing circuit 4. The fixing circuit 4 generates the frequency restriction signal when a predetermined time has passed after switching of the oscillation signal from a high level (H) to a low level (L), or vice versa.

A reference voltage generating circuit 10 receives a power voltage Vcc from the Vcc terminal T1 and generates a reference voltage Vref. An external capacitor is connected to the quasi resonant type switching power supplying unit 100 via the VREF terminal T6. The power voltage Vcc is supplied to the external capacitor, and a reference voltage Vref is obtained from the charge voltage of the external capacitor.

A low-voltage detecting circuit 11 compares the power voltage Vcc with a threshold voltage UVL. When the power voltage Vcc is less than or equal to the threshold voltage UVL, the low-voltage detecting circuit 11 outputs a stop signal to the oscillation circuit 3 and to a driver circuit 18. When the power voltage Vcc is greater than or equal to a threshold voltage UVH, the low-voltage detecting circuit 11 outputs a stop reset signal to the oscillation circuit 3 and to the driver circuit 18. The oscillation circuit 3 stops generating the oscillation signal upon receiving a stop signal and restarts generating the oscillation signal upon receiving a stop reset signal. In this manner, the low-voltage detecting circuit 11 has two threshold voltages UVL and UVH to provide a hysteresis (i.e., a voltage difference) at both the start and the end of the generation of the oscillation signal.

A high-voltage detecting circuit 12 compares the power voltage Vcc with a threshold voltage OVP. When the power voltage Vcc is greater than the threshold voltage OVP, the high-voltage detecting circuit 12 outputs a stop signal to a latch circuit 9. The latch circuit 9 latches a signal produced from the oscillation edge circuit 8 in response to the stop signal. A state-of-overheat detecting circuit 13 detects the temperature of the quasi resonant type switching power supplying unit 100 and outputs a stop signal to the latch circuit 9 when the temperature exceeds a predetermined reference temperature. The latch circuit 9 latches a signal generated from the oscillation edge circuit 8 in response to the stop signal received from the state-of-overheat detecting circuit 13.

An oscillation level comparison circuit 15 receives a detection voltage $V_{COM}$ (i.e., a voltage containing a load voltage input from the FB terminal T3 and a voltage input from the sensing MOSFET 2), and compares the detection voltage $V_{COM}$ with the reference voltage Vref supplied from the reference voltage generating circuit 10. When the detection voltage $V_{COM}$ is less than or equal to the reference voltage Vref, the oscillation level comparison circuit 15 outputs a low-level reset signal. When the detection voltage $V_{COM}$ is greater than the reference voltage Vref, the oscillation level comparison circuit 15 outputs a high-level reset signal.

A pulse width modulation circuit 16 is a RS flip-flop circuit having a set terminal S, a reset terminal R, and an output terminal Q. A pulse signal having passed the latch circuit 9 is input via a buffer 17 to the set terminal S of the pulse width modulation circuit 16. An output signal of the oscillation level comparison circuit 15 is fed to the reset terminal R of the pulse width modulation circuit 16. A signal produced from the output terminal Q of the pulse width modulation circuit 16 is supplied via the driver circuit 18 to a gate electrode of the MOSFET 1 and to a gate electrode of the MOSFET 2.

The conventional quasi resonant type switching power supplying unit 100 uses the power voltage Vcc to charge the capacitor and obtains the reference voltage Vref from the charge voltage. In such a case, a required capacitance is in the range of several hundreds nF to several μF. In general, such a large-sized capacitor cannot be incorporated in the quasi resonant type switching power supplying unit 100. Accordingly, it is necessary to provide the VREF terminal T6 to which the external capacitor is connected.

In general, providing the VREF terminal dedicated to the external capacitor increases a package size of the quasi resonant type switching power supplying unit 100. Furthermore, when the quasi resonant type switching power supplying unit 100 is mounted on a circuit, a process for connecting a capacitor to the circuit is necessary and accordingly the manufacturing process becomes complicated and the manufacturing cost increases.

Furthermore, if a load is short-circuited in the conventional quasi resonant type switching power supplying unit 100, the capacitor connected to the VREF terminal T6 is continuously charged and the reference voltage Vref is maintained at a high voltage value. Accordingly, the oscillation level comparison circuit 15 cannot detect a problem occurring in the circuit. Thus, power supply to the load cannot be stopped and the quasi resonant type switching power supplying unit 100 is brought into an excessive load condition.

SUMMARY OF THE INVENTION

The present invention provides a quasi resonant type switching power supplying unit including a switching element that causes repetitive switching to intermittently supply electric power to a primary winding of an external transducer, thereby supplying electric power to a load connected to a secondary winding of the transducer which is electromagnetically connected with the primary winding. The quasi resonant type switching power supplying unit includes an overcurrent limiting circuit and an oscillation level comparison circuit. The overcurrent limiting circuit receives a reverse electromotive voltage generated from an auxiliary winding of the transducer which is electromagnetically connected with the primary winding when the switching element is in an OFF state, and produces a reference voltage stepwise based on the reverse electromotive voltage. And, the oscillation level comparison circuit receives a detection voltage corresponding to the electric power supplied to the load, and produces a control signal that brings the switching element into an OFF state when a voltage corresponding to the detection voltage exceeds the reference voltage.

BRIEF DESCRIPTION OF THE DRAWINGS

The accompanying drawings, which are incorporated in and constitute a part of the present specification, illustrate an embodiment of the invention and, together with the description, serve to explain the principles of the invention. In these drawings.

DESCRIPTION OF PREFERRED EMBODIMENT

Figure 1:
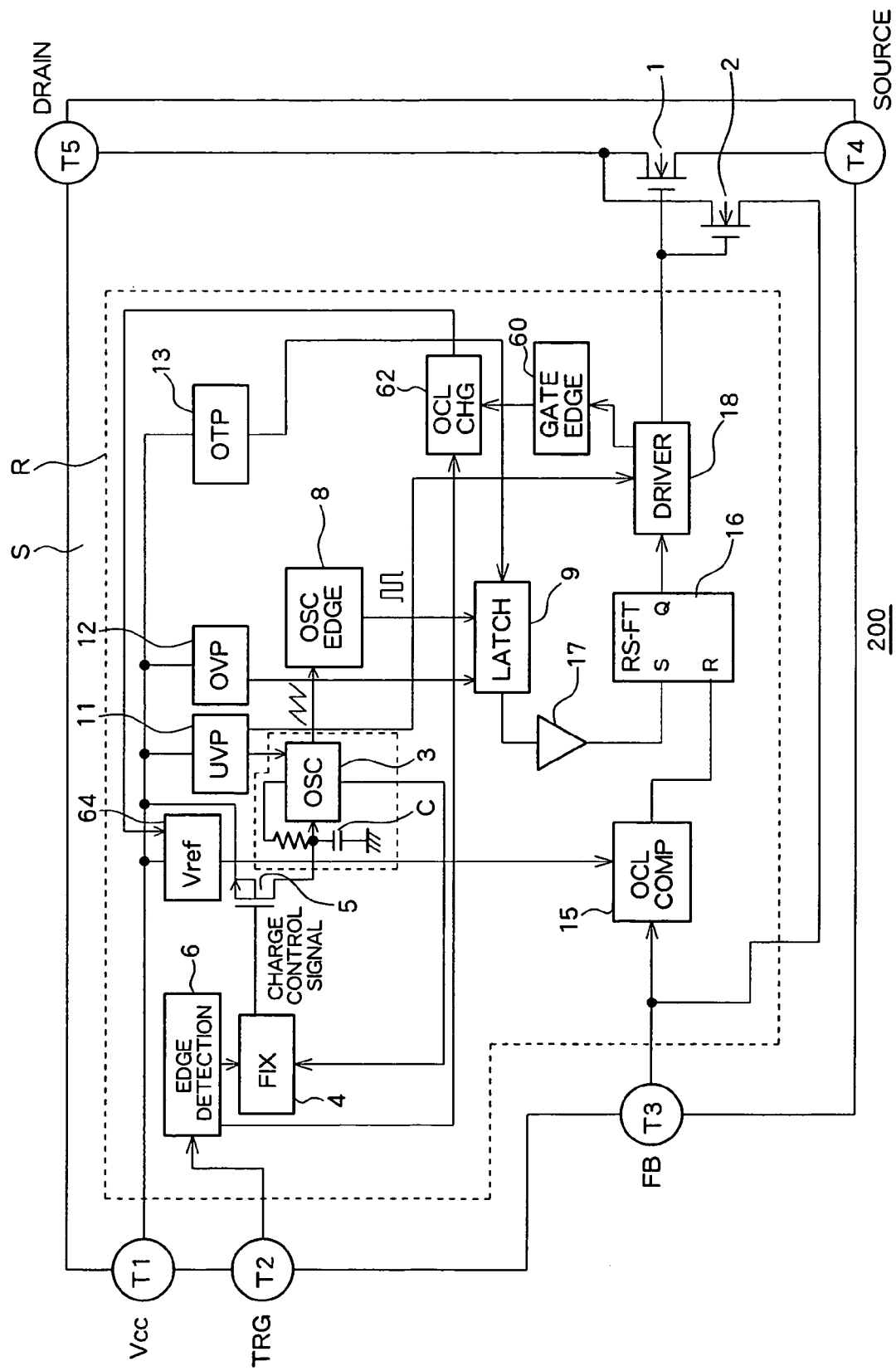
FIG. 1 is a block diagram showing a circuit arrangement of a quasi resonant type switching power supplying unit in accordance with one embodiment of the present invention.
Figure 7:
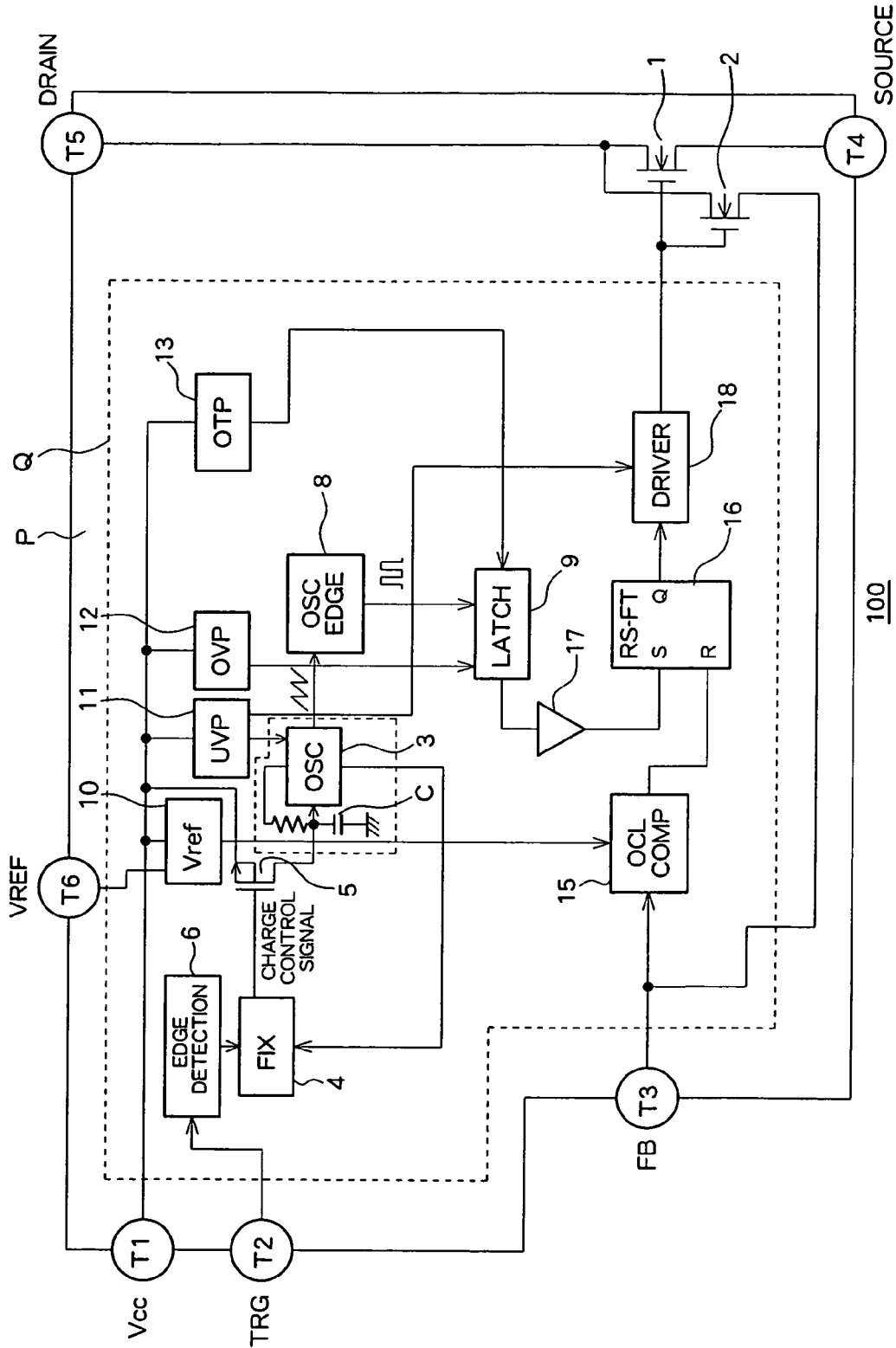
FIG. 7 is a block diagram showing a conventional quasi resonant type switching power supplying unit.

A quasi resonant type switching power supplying unit 200 according to one embodiment of the present invention includes an integrated circuit R, a MOSFET 1, and a MOSFET 2 that are housed in a package S as shown in FIG. 1. In FIG. 1, components or portions identical to those in the conventional quasi resonant type switching power supplying unit 100 shown in FIG. 7 are denoted by the same reference numerals.

The quasi resonant type switching power supplying unit 200 includes a power MOSFET 1, a sensing MOSFET 2, an oscillation circuit 3, a fixing circuit 4, a MOSFET 5, an edge detecting circuit 6, an oscillation edge circuit 8, a latch circuit 9, a low-voltage detecting circuit 11, a high-voltage detecting circuit 12, a state-of-overheat detecting circuit 13, an oscillation level comparison circuit 15, a pulse width modulation circuit 16, a buffer 17, a driver circuit 18, a gate edge circuit 60, a level determining circuit 62, and a reference voltage generating circuit 64.

The quasi resonant type switching power supplying unit 200 has a Vcc terminal T1, a TRG terminal T2, an FB terminal T3, a SOURCE terminal T4, and a DRAIN terminal T5. The quasi resonant type switching power supplying unit 200 does not require the VREF terminal T6 equipped in the conventional quasi resonant type switching power supplying unit 100 shown in FIG. 7.

A source electrode of the MOSFET 1 is connected to the SOURCE terminal T4 and a drain electrode of the MOSFET 1 is connected to the DRAIN terminal T5. The MOSFET 1 can be used as a switching element. The drain electrode of the MOSFET 1 is connected to a drain electrode of the MOSFET 2.

The edge detecting circuit 6 is connected to the TRG terminal T2. The edge detecting circuit 6 outputs a pulse signal in synchronism with the timing the voltage level of a signal input from the TRG terminal T2 transfers from a state exceeding a predetermined threshold voltage $V_{EG}$ to a state lower than the threshold voltage $V_{EG}$. As described later, a trigger signal $S_{TRG}$ is input to the trigger terminal T2. The trigger signal $S_{TRG}$, generated from an auxiliary winding of an external transducer, has a waveform similar to that of a voltage applied between the drain and source electrodes of the MOSFET 1. The trigger signal $S_{TRG}$ has a voltage value proportional to the voltage generated from a secondary winding 24. The ratio of the voltage of the trigger signal $S_{TRG}$ and the voltage generated from the secondary winding 24 is equal to a winding ratio. The pulse signal produced from the edge detecting circuit 6 is supplied to the fixing circuit 4.

The fixing circuit 4 receives a feedback signal returned from the oscillation circuit 3 in addition to the pulse signal supplied from the edge detecting circuit 6, and generates a charge control signal. The fixing circuit 4 generates a frequency restricting signal, based on the signal of the oscillation circuit 3, when a predetermined time has passed after the switching of the oscillation signal from a high level (H) to a low level (L) or vice versa. Furthermore, the fixing circuit 4 generates the charge control signal as a result of a logic operation applied to the frequency restricting signal and the pulse signal supplied from the edge detecting circuit 6.

When the charge control signal is input from the fixing circuit 4, the MOSFET 5 turns into an ON state to charge a capacitor C in the oscillation circuit 3. With this arrangement, the charge time of the capacitor C can be shortened.

The oscillation circuit 3 includes an oscillator capable of generating a saw-like signal. A charge voltage of the capacitor C is applied via a resistor to the oscillation circuit 3. The oscillation circuit 3 generates a saw-like oscillation signal having a gradient corresponding to the charge voltage of the capacitor C when a stop reset signal is input from the low-voltage detecting circuit 11. More specifically, the oscillation circuit 3 generates a saw-like signal in synchronism with the timing the pulse signal is generated from the edge detecting circuit 6. The oscillation circuit 3 supplies the saw-like signal to the oscillation edge circuit 8.

The oscillation edge circuit 8, after having received the saw-like signal, detects an edge of the saw-like signal and converts the saw-like signal into a pulse signal. The generated pulse signal is sent to the latch circuit 9.

The latch circuit 9 receives the pulse signal from the oscillation edge circuit 8 and outputs a set signal to the buffer 17, and, unless it has received a stop signal from the high-voltage detecting circuit 12 or from the state-of-overheat detecting circuit 13, directly outputs the pulse signal to the buffer 17. On the other hand, when a stop signal has been received from either the high-voltage detecting circuit 12 or the state-of-overheat detecting circuit 13, the latch circuit 9 outputs the latched pulse signal. The output signal of the latch circuit 9 is sent via the buffer 17 to the pulse width modulation circuit 16.

The oscillation level comparison circuit 15 receives a detection voltage $V_{COM}$ which contains a load voltage input from the FB terminal T3 and a voltage input from the sensing MOSFET 2, and compares the detection voltage $V_{COM}$ with a reference voltage Vref supplied from the reference voltage generating circuit 64. When the detection voltage $V_{COM}$ is less than or equal to the reference voltage Vref, the oscillation level comparison circuit 15 outputs a low-level reset signal. The oscillation level comparison circuit 15 outputs a high-level reset signal in synchronism with the timing the detection voltage $V_{COM}$ exceeds the reference voltage Vref. As described further below, according to the present embodiment, the reference voltage Vref can be set stepwise in accordance with the amplitude of a trigger signal $S_{TRG}$ input from the TRG terminal T2. The reset signal is sent to the pulse width modulation circuit 16.

The pulse width modulation circuit 16 includes an RS flip-flop circuit having a set terminal S, a reset terminal R, and an output terminal Q. The set signal produced from the latch circuit 9 is sent via the buffer 17 to the set terminal S of the pulse width modulation circuit 16. The reset signal produced from the oscillation level comparison circuit 15 is input to the reset terminal R of the pulse width modulation circuit 16. More specifically, the output terminal Q of the pulse width modulation circuit 16 switches to a high level when the set signal of the latch circuit 9 rises from a low level to a high level. The output terminal Q of the pulse width modulation circuit 16 turns into a low level at the timing the output of the oscillation level comparison circuit 15 changes from a lower level to a high level. A signal produced from the output terminal Q of the pulse width modulation circuit 16 is supplied via the driver circuit 18 to a gate electrode of the MOSFET 1 and to a gate electrode of the MOSFET 2.

The driver circuit 18 can amplify the signal produced from the output terminal Q of the pulse width modulation circuit 16, if necessary, and output a gate signal $S_{DRV}$. The gate signal $S_{DRV}$ is sent to the gate electrodes of the MOSFET 1 and the MOSFET 2 and to the gate edge circuit 60. When the gate signal $S_{DRV}$ is in a high level, both of the MOSFET 1 and the MOSFET 2 are turned into an ON state. When the gate signal $S_{DRV}$ is in a low level, both of the MOSFET 1 and the MOSFET 2 are turned into an OFF state. Furthermore, it is preferable to control the output of the driver circuit 18 in accordance with a stop signal supplied from the low-voltage detecting circuit 11.

The low-voltage detecting circuit 11 is connected to the Vcc terminal T1. The low-voltage detecting circuit 11 receives a power voltage Vcc from the Vcc terminal T1 and compares the power voltage Vcc with a predetermined threshold voltage UVL. When the power voltage Vcc is less than or equal to the threshold voltage UVL, the low-voltage detecting circuit 11 outputs a stop signal to the oscillation circuit 3 and to the driver circuit 18. When the power voltage Vcc is greater than or equal to a threshold voltage UVH, the low-voltage detecting circuit 11 outputs a stop reset signal to the oscillation circuit 3 and to the driver circuit 18. The oscillation circuit 3 starts generating the oscillation signal upon receiving the stop reset signal and stops generating the oscillation signal upon receiving the stop signal. In this manner, the low-voltage detecting circuit 11 has two threshold voltages UVL and UVH to provide a hysteresis (i.e., a voltage difference) in both starting and stopping the generation of the oscillation signal.

The high-voltage detecting circuit 12 is connected to the Vcc terminal T1. The high-voltage detecting circuit 12 receives the power voltage Vcc from the Vcc terminal T1, and compares the power voltage Vcc with a predetermined threshold voltage OVP. When the power voltage Vcc is greater than the threshold voltage OVP, the high-voltage detecting circuit 12 outputs a stop signal to the latch circuit 9. After receiving the stop signal, the latch circuit 9 latches a signal produced from the oscillation edge circuit 8.

The state-of-overheat detecting circuit 13 detects the temperature of the quasi resonant type switching power supplying unit 200 and outputs a stop signal to the latch circuit 9 when the temperature exceeds a predetermined reference temperature $T_{REF}$. The latch circuit 9 latches a signal generated from the oscillation edge circuit 8 in response to the stop signal received from the state-of-overheat detecting circuit 13.

Figure 2:
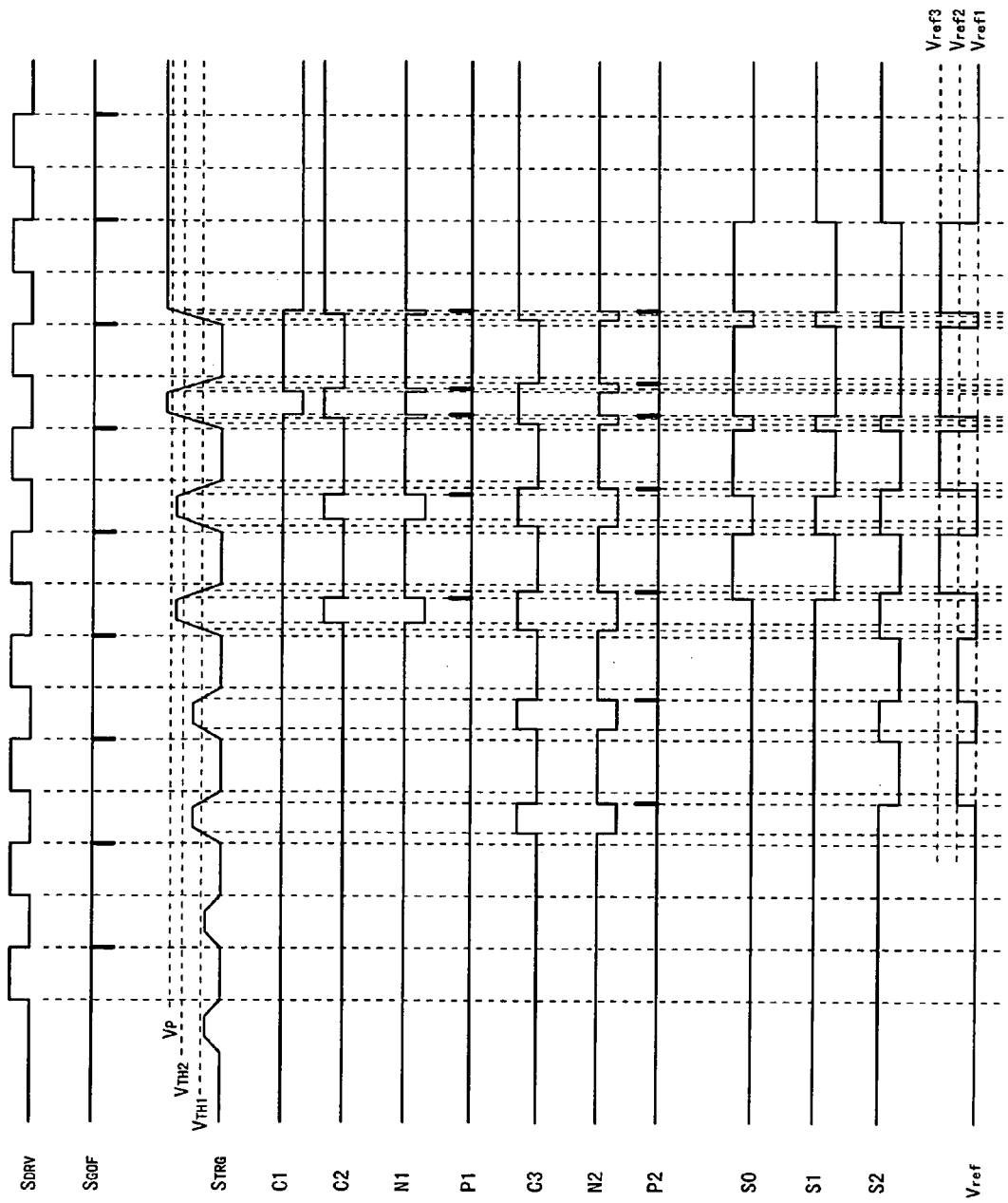
FIG. 2 is a timing diagram showing an operation of the quasi resonant type switching power supplying unit in accordance with the embodiment of the present invention.

The gate edge circuit 60 receives a gate signal $S_{DRV}$ from the driver circuit 18 and outputs as a gate-off edge signal $S_{GOF}$ a pulse signal changing from a high level to a low level, as shown in FIG. 2, at the timing the gate signal $S_{DRV}$ falls from a high level to a low level. The gate-off edge signal $S_{GOF}$ is supplied to the level determining circuit 62. The gate-off edge signal $S_{GOF}$ can be used as a reset signal that terminates a setting period of the reference voltage Vref, which is set in the oscillation level comparison circuit 15, at the timing the MOSFET 1 is brought into an OFF state.

Figure 3:
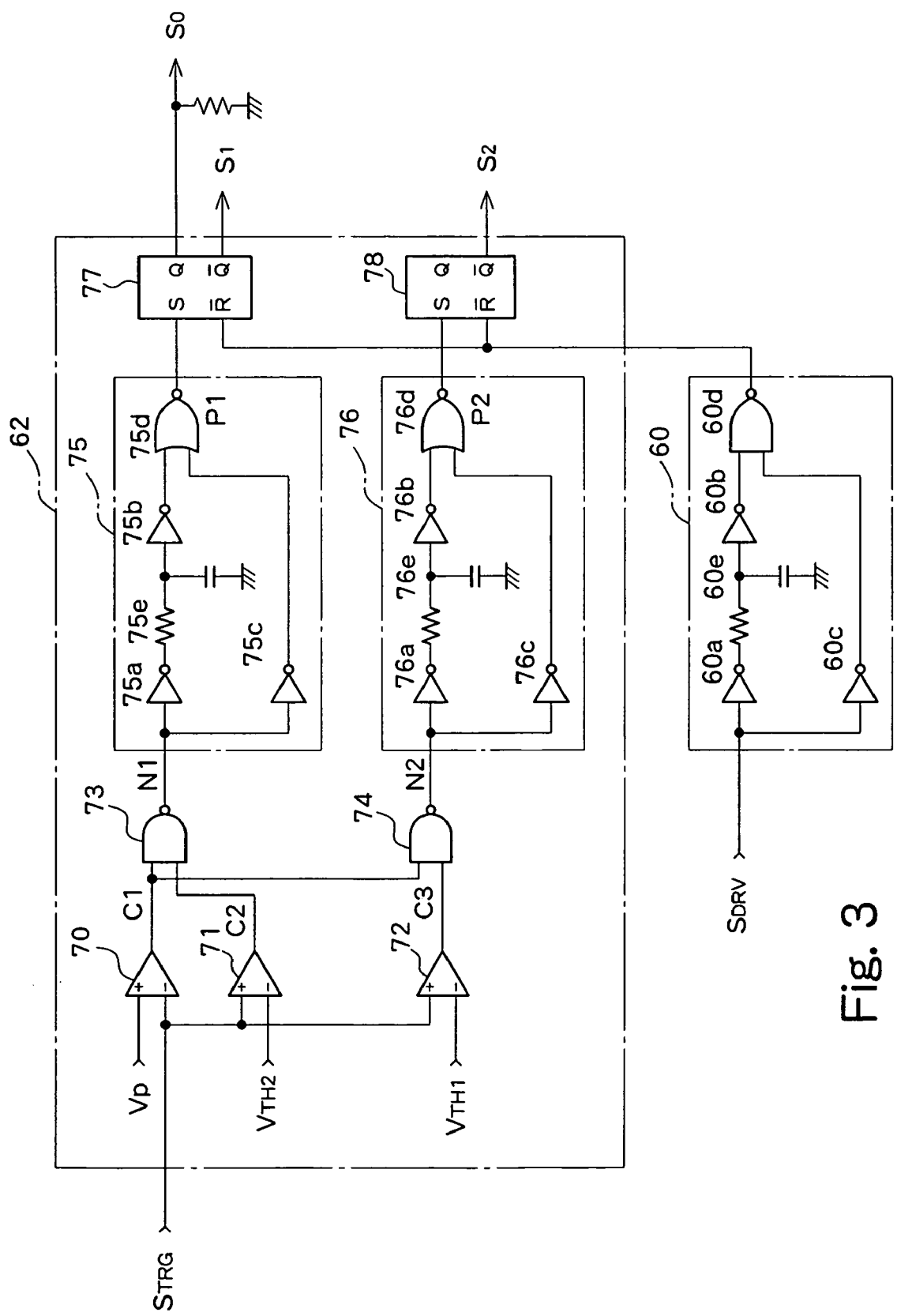
FIG. 3 is a circuit diagram showing a gate edge circuit and a level determining circuit in accordance with the embodiment of the present invention.

For example, as shown in FIG. 3, the gate edge circuit 60 includes three NOT elements 60a, 60b and 60c, one NAND element 60d, and one low-pass filter 60e. The NOT elements 60a and 60c have input terminals respectively receiving the gate signal $S_{DRV}$. The NOT element 60a has an output terminal connected via the low-pass filter 60e to an input terminal of the NOT element 60b. The NOT elements 60b and 60c have output terminals respectively connected to input terminals of the NAND element 60d. The circuit arrangement of the gate edge circuit 60 is not limited to the disclosed one, and accordingly can be modified in various ways so that the pulse signal and the like can be transmitted to the level determining circuit 62 in synchronism with the timing the MOSFET 1 turns into an OFF state.

The level determining circuit 62 receives the trigger signal $S_{TRG}$ input from the TRG terminal T2 and determines whether the trigger signal $S_{TRG}$ is greater than or equal to a predetermined threshold voltage. The level determining circuit 62 can determine the reference voltage Vref to be used in the next switching cycle, based on the fact that the trigger signal $S_{TRG}$ is proportional to a voltage generated from the secondary winding 24.

The level determining circuit 62 as shown in FIG. 3 can be constructed as an edge detecting circuit including comparators. For example, the level determining circuit 62 includes comparators 70, 71 and 72, NAND elements 73 and 74, edge detecting circuits 75 and 76, and RS flip-flop circuits 77 and 78. However, the circuit arrangement of the level determining circuit 62 is not limited to the disclosed one and accordingly can be modified in various ways so that the trigger signal $S_{TRG}$ can be compared with a predetermined threshold voltage and a control signal determining the reference voltage can be produced based on the comparison result.

The comparator 70 has a noninverting input terminal (+) receiving a threshold voltage Vp and an inverting input terminal (−) receiving the trigger signal $S_{TRG}$. The comparator 70, as shown in FIG. 2, generates a high-level output when the trigger signal $S_{TRG}$ is less than or equal to the threshold voltage Vp and generates a low-level output when the trigger signal $S_{TRG}$ is greater than the threshold voltage Vp. The comparator 71 has a noninverting input terminal (+) receiving the trigger signal. $S_{TRG}$ and an inverting input terminal (−) receiving a threshold voltage $V_{TH2}$. The comparator 71, as shown in FIG. 2, generates a low-level output when the trigger signal $S_{TRG}$ is less than the threshold voltage $V_{TH2}$ and generates a high-level output when the trigger signal $S_{TRG}$ is greater than or equal to the threshold voltage $V_{TH2}$.

An output C1 of the comparator 70 and an output C2 of the comparator 71 are input into the NAND element 73. Accordingly, as shown in FIG. 2, the NAND element 73 produces a low-level output N1 when both the output C1 of the comparator 70 and the output C2 of the comparator 71 are in a high level, i.e., when the trigger signal $S_{TRG}$ is not smaller than the threshold voltage $V_{TH2}$ and not greater than the threshold voltage Vp.

An edge detecting circuit 75 inputs the output N1 of the NAND element 73. As shown in FIG. 2, the edge detecting circuit 75 outputs an edge pulse signal P1 in synchronism with the timing the output N1 turns from a low level to a high level.

For example, as shown in FIG. 3, the edge detecting circuit 75 can include three NOT elements 75a, 75b and 75c, one NOR element 75d, and one low-pass filter 75e. The NOT elements 75a and 75c have input terminals respectively receiving the output N1. The NOT element 75a has an output terminal connected via the low-pass filter 75e to an input terminal of the NOT element 75b. The NOT elements 75b and 75c have output terminals respectively connected to input terminals of the NOR element 75d.

The RS flip-flop circuit 77 has a set terminal S receiving the edge pulse signal P1 from the edge detecting circuit 75, and a reset terminal R(bar) receiving the gate-off edge signal $S_{GOF}$ from the gate edge circuit 60. The RS flip-flop circuit 77 turns an output signal $S_0$ of its output terminal Q from a low level to a high level in synchronism with the timing the trigger signal $S_{TRG}$ transfers from a state not less than the threshold voltage $V_{TH2}$ and not greater than the threshold voltage Vp to a state less than the threshold voltage $V_{TH2}$ or to a state exceeding the threshold voltage Vp. In other words, the RS flip-flop circuit 77 turns an output signal $S_1$ of its inverting output terminal Q(bar) from a high level to a low level.

Then, the RS flip-flop circuit 77 resets the output signal $S_0$ of its output terminal Q from a high level to a low level in synchronism with the timing the gate-off edge signal $S_{GOF}$ changes from a high level to a low level, i.e., the timing the gate signal $S_{DRV}$ changes from a high level to a low level to bring the MOSFET 1 into an OFF state. In other words, the RS flip-flop circuit 77 resets the output signal $S_1$ of its inverting output terminal Q (bar) from a low level to a high level.

The output signal $S_1$ can be used as a control signal determining the reference voltage Vref in the reference voltage generating circuit 64.

As apparent from FIG. 2, when the trigger signal $S_{TRG}$ is maintained in the state exceeding the threshold voltage Vp for a period of time longer than 1 cycle for some reasons, the RS flip-flop circuit 77 continuously produces a low-level output signal from its output terminal Q (i.e., continuously produces a high-level output from its inverting output terminal Q (bar)).

The total number of comparators can be increased if it is necessary to divide the reference voltage Vref into multiple (more than two) stages. The comparator 72 has a noninverting input terminal (+) receiving the trigger signal $S_{TRG}$ and an inverting input terminal (−) receiving a threshold voltage $V_{TH1}$. The comparator 72 produces a low-level output when the trigger signal $S_{TRG}$ is less than the threshold voltage $V_{TH1}$ and produces a high-level output when the trigger signal $S_{TRG}$ is greater than or equal to the threshold voltage $V_{TH1}$.

Furthermore, the output C3 of the comparator 72 is input to an input terminal of a NAND element 74. Under a condition that the other input terminal of the NAND element 74 is maintained at a high level, the NAND element 74 produces a low-level output N2 if the trigger signal $S_{TRG}$ is greater than or equal to the threshold voltage $V_{TH1}$.

The NAND element 74 receives the output C1 of the comparator 70 and the output C3 of the comparator 72. Accordingly, as shown in FIG. 2, the NAND element 74 produces a low-level output N2 only when the output C1 of the comparator 70 and the output C3 of the comparator 72 are both in a high level, i.e., when the trigger signal $S_{TRG}$ is not less than the threshold voltage $V_{TH1}$ and not greater than the threshold voltage Vp.

An edge detecting circuit 76 inputs the output N2 of the NAND element 74. As shown in FIG. 2, the edge detecting circuit 76 outputs an edge pulse signal P2 in synchronism with the timing the output N2 turns from a low level to a high level. As shown in FIG. 3, the edge detecting circuit 76 can include three NOT elements 76a, 76b and 76c, one NOR element 76d, and one low-pass filter 76e that are identical with those of the edge detecting circuit 75.

The RS flip-flop circuit 78 has a set terminal S receiving the edge pulse signal P2 from the edge detecting circuit 76, and a reset terminal R(bar) receiving the gate-off edge signal $S_{GOF}$ from the gate edge circuit 60. The RS flip-flop circuit 78 turns an output signal $S_2$ of its inverting output terminal Q(bar) from a high level to a low level in synchronism with the timing the trigger signal $S_{TRG}$ transfers from a state not less than the threshold voltage $V_{TH1}$ and not greater than the threshold voltage Vp to a state less than the threshold voltage $V_{TH1}$ or to a state exceeding the threshold voltage Vp.

Then, the RS flip-flop circuit 78 resets the output signal $S_2$ of its inverting output terminal Q(bar) from a low level to a high level in synchronism with the timing the gate-off edge signal $S_{GOF}$ changes from a high level to a low level, i.e., the timing the gate signal $S_{DRV}$ changes from a high level to a low level to bring the MOSFET 1 into an OFF state. The output signal $S_2$ can be used as a control signal that can set multiple stages of the reference voltage Vref in the reference voltage generating circuit 64. As apparent from FIG. 2, when the trigger signal $S_{TRG}$ is maintained in the state exceeding the threshold voltage Vp for some reasons, the RS flip-flop circuit 78 continuously produces a high-level output from its inverting output terminal Q (bar).

The threshold voltages used in the present embodiment are in a predetermined relationship, i.e., threshold voltage $V_{TH1}$<threshold voltage $V_{TH2}$<threshold voltage Vp. For example, the threshold voltage $V_{TH1}$ can be set to 1.9V. The threshold voltage $V_{TH2}$ can be set to 3.8V. The threshold voltage Vp can be set to Vcc-1.5V. Furthermore, the total number of comparators can be increased to provide a sufficient number of multiple stages of the reference voltage Vref that can be used as threshold voltages in the comparison with the trigger signal $S_{TRG}$.

Figure 4:
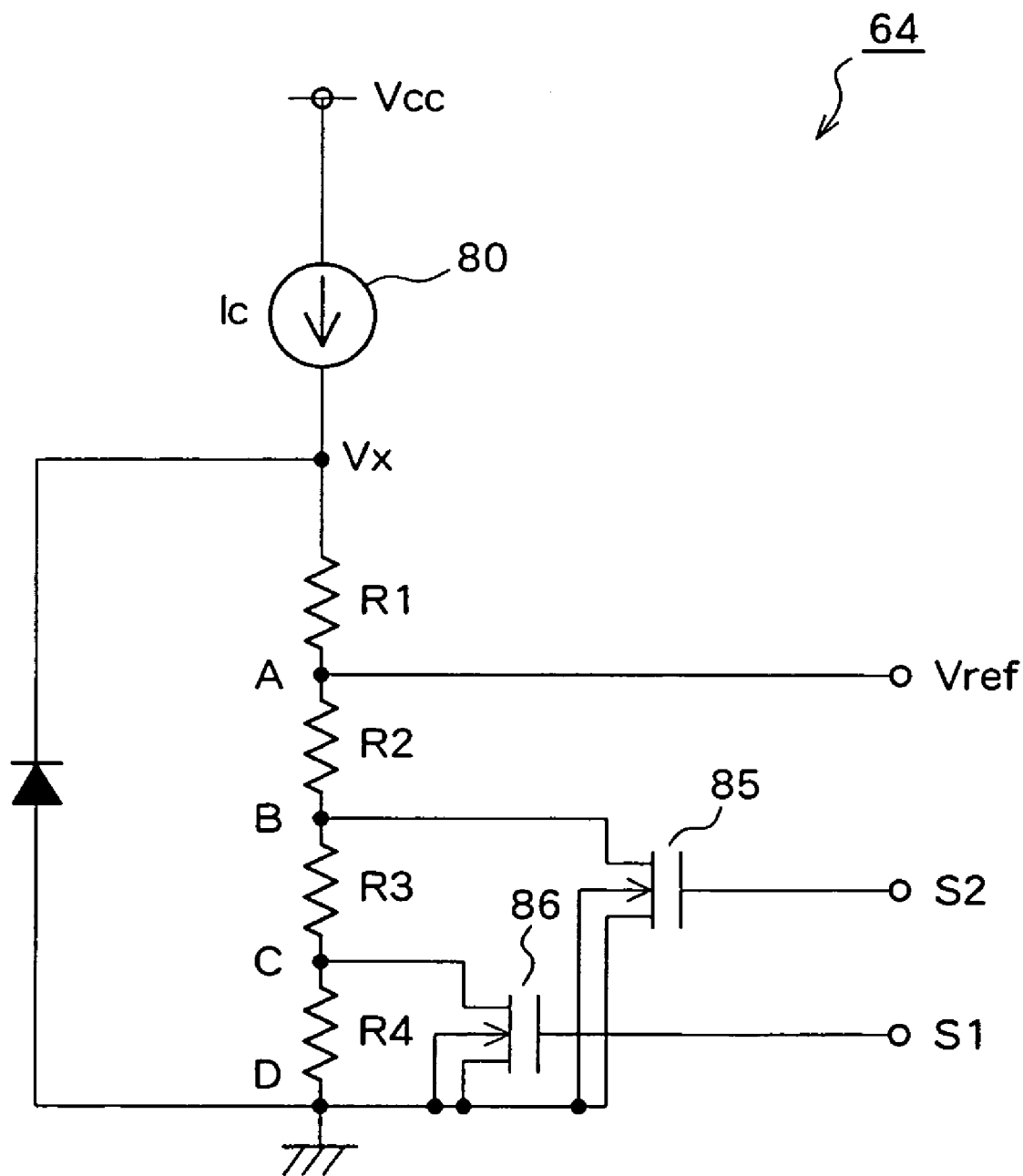
FIG. 4 is a circuit diagram showing a reference voltage generating circuit in accordance with the embodiment of the present invention.

The reference voltage generating circuit 64 receives the output signals $S_1$ and $S_2$ of the level determining circuit 62 and produces the reference voltage Vref stepwise in accordance with the output signals $S_1$ and $S_2$. The reference voltage generating circuit 64, as shown in FIG. 4, includes a constant-current source 80, resistance elements R1 to R4, and transistors 85 and 86. However, the arrangement of the reference voltage generating circuit 64 is not limited to the disclosed one and can be modified in various ways so that the reference voltage Vref can be output stepwise in accordance with the control signal received from the level determining circuit 62.

The resistance elements R1 to R4 are serially connected. The resistance element R4 is connected at its one end D to the ground. The constant-current source 80 supplies constant current Ic to the resistance elements R1 to R4. Both ends B and D of a serial circuit consisting of the resistance elements R3 and R4 are connected to source and drain electrodes of the transistor 85. Furthermore, both ends C and D of the resistance element R4 are connected to source and drain electrodes of the transistor 86. The transistor 85 has a gate electrode that receives the output signal $S_2$ from the level determining circuit 62. The transistor 86 has a gate electrode that receives the output signal $S_1$ from the level determining circuit 62. The reference voltage generating circuit 64 can produce the reference voltage Vref from a connecting point A of the resistance element R1 and the resistance element R2.

When the output signal $S_2$ of the level determining circuit 62 is maintained at a high level, the source and drain electrodes of the transistor 85 are short-circuited and accordingly the reference voltage generating circuit 64 produces a reference voltage $Vref_1=(R2\times Vx)/(R1+R2)$.

When the output signal $S_2$ of the level determining circuit 62 is maintained at a low level and the output signal $S_1$ of the level determining circuit 62 is maintained at a high level, the source and drain electrodes of the transistor 85 are opened and the source and drain electrodes of the transistor 86 are short-circuited and accordingly the reference voltage generating circuit 64 produces a reference voltage reference voltage $Vref_2=((R2+R3)\times Vx))/(R1+R2+R3)$.

When both of the output signals $S_1$ and $S_2$ of the level determining circuit 62 turn into a low level, the source and drain electrodes of respective transistors 85 and 86 are opened and accordingly the reference voltage generating circuit 64 produces a reference $Vref_3=((R2+R3+R4)\times Vx))/(R1+R2+R3+R4)$. The value of Vx is dependent on a reverse bias voltage of a diode connected in parallel with the resistance elements R1 to R4.

Adequately determining the resistance elements R1 to R4 can satisfy a required relationship, i.e., reference voltage $Vref_1$<reference voltage $Vref_2$<reference voltage $Vref_3$. For example, setting practical values of R1=200 kΩ, R2=50 kΩ, R3=100 kΩ, R4=300 kΩ, and Vx=5.7V provides practical reference voltage values of $Vref_1$=approximately 1.14V, $Vref_2$=approximately 2.44V, and $Vref_3$=approximately 3.95V.

The level determining circuit 62 and the reference voltage generating circuit 64 cooperatively constitute an overcurrent limiting circuit. The overcurrent limiting circuit requires no external capacitor, and can by itself produce and output the reference voltage Vref corresponding to the amplitude of the trigger signal $S_{TRG}$ to the oscillation level comparison circuit 15.

It is preferable that the overcurrent limiting circuit produces a lowest reference voltage when the load is brought into a short-circuited condition. This can reduce the period of time during which the switching element is continuously maintained in an ON state even when the load is short-circuited, thereby ensuring the effect of protecting the device from overcurrent.

Figure 5:
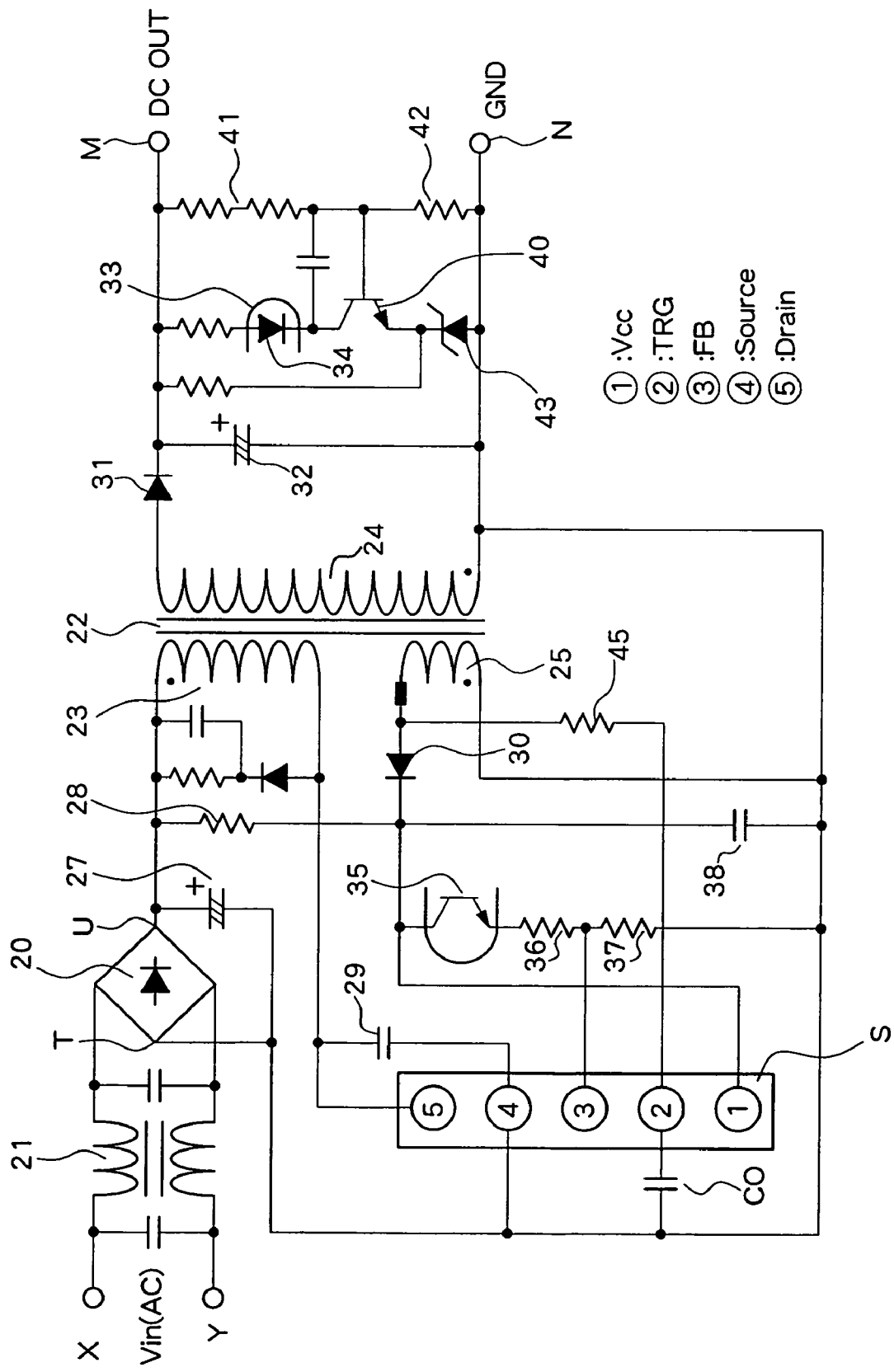
FIG. 5 is a circuit diagram showing the quasi resonant type switching power supplying unit in accordance with the embodiment of the present invention.

The quasi resonant type switching power supplying unit 200 can be incorporated in a quasi resonant type switching power apparatus shown in FIG. 5.

A full-wave rectification circuit 20 is connected via a choke coil 21 to a terminal X and a terminal Y between which a commercial power supply Vin is applied. A transducer 22 includes a primary winding 23, a secondary winding 24, and an auxiliary winding 25. The primary winding 23 has a first terminal connected to a terminal U of the full-wave rectification circuit 20. The primary winding 23 has a second terminal connected to the DRAIN terminal T5 of the quasi resonant type switching power supplying unit 200. The full-wave rectification circuit 20 has a terminal T connected to the SOURCE terminal T4 of the quasi resonant type switching power supplying unit 200.

The second terminal of the primary winding 23 is connected via a voltage resonant capacitor 29 to the SOURCE terminal T4 of the quasi resonant type switching power supplying unit 200. The quasi resonant type switching can be realized by adjusting the capacitance of the voltage resonant capacitor 29.

A ripple filter circuit 27 is interposed between two terminals T and U of the full-wave rectification circuit 20. The ripple filter circuit 27 can smooth a DC voltage rectified in the full-wave rectification circuit 20. The DC voltage, after having been rectified in the full-wave rectification circuit 20 and smoothed in the ripple filter circuit 27, is supplied via an start-up resistor 28 to the VCC terminal T1 of the quasi resonant type switching power supplying unit 200 as a power voltage Vcc. The auxiliary winding 25 has one end connected via a diode 30 to the Vcc terminal T1 and also connected via a resistor 45 to the TRG terminal T2.

The secondary winding 24 of the transducer 22 has a first terminal connected to a ground terminal N of the load and a second terminal connected to an anode of a diode 31. A cathode of the diode 31 is connected to the load.

Furthermore, a DC-OUT terminal M is connected via a capacitor 32 to the ground terminal N of the load. A photo coupler 33 is connected via a resistor to the DC-OUT terminal M. A serial circuit of the resistor, the photo coupler 33, a transistor 40, and a Zener diode 43 is interposed between the DC-OUT terminal M and the ground terminal N of the load. Furthermore, another serial circuit of a resistor 41 and a resistor 42 is interposed between the DC-OUT terminal M and the ground terminal N of the load.

The photo coupler 33 is substantially a combination of a light-emitting diode 34 and a photo-transistor 35. The photo coupler 33 and the transistor 40 cooperatively constitute an essential part of an error amplification circuit that can feed a power supplied to the load of a secondary circuit back to a primary circuit. The light-emitting diode 34 has an anode connected to a cathode of the diode 31 via the resistance. The light-emitting diode 34 has a cathode connected to a collector of the transistor 40. The transistor 40 has an emitter connected via the Zener diode 43 to the ground terminal of the load (i.e., to the first terminal of the secondary winding 24).

The transistor 40 can detect a change of the load voltage applied between the terminal M and the terminal N. The transistor 40 has a base connected to a joint of the resistor 41 and the resistor 42. The collector of the transistor 40 is connected via a capacitor to the joint of the resistor 41 and the resistor 42. The emitter of the transistor 40 is connected via a resistor to the cathode of the diode 31.

The secondary winding 24 of the transducer 22 is electromagnetically connected with the auxiliary winding 25. A first terminal of the auxiliary winding 25 is grounded. A second terminal of the auxiliary winding 25 is connected to an anode of the diode 30. Furthermore, the second terminal of the auxiliary winding 25 is connected via the resistor 45 to the TRG terminal T2.

A cathode of the diode 30 is connected to the Vcc terminal T1. Furthermore, the cathode of the diode 30 is grounded via a serial circuit of the photo-transistor 35, a resistor 36, and a resistance 37. Furthermore, the cathode of the diode 30 is grounded via a capacitor 38.

The photo-transistor 35 has a collector connected to the cathode of the diode 30. The photo-transistor 35 has an emitter connected to the resistor 36. The photo-transistor 35 has a base photoelectrically connected to the light-emitting diode 34 provided in the secondary circuit. A joint of the resistor 36 and the resistance 37 is connected to the FB terminal T3.

Figure 6:
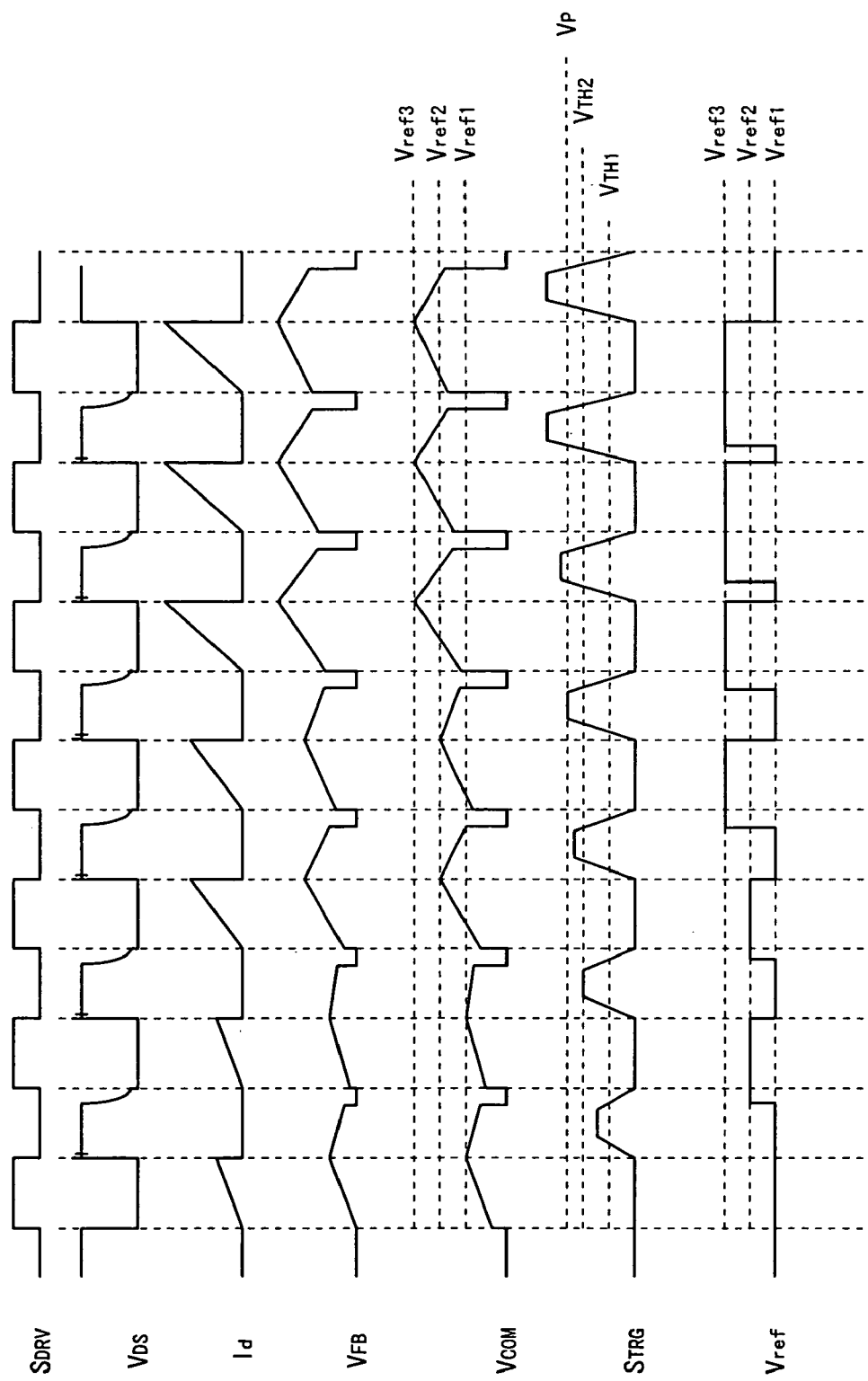
FIG. 6 is a timing diagram showing an operation of the quasi resonant type switching power supplying unit in accordance with the embodiment of the present invention.

Next, with reference to FIGS. 1 to 6, various functions of the quasi resonant type switching power apparatus will be described. FIG. 6 is a timing diagram showing temporal change of various signals in the quasi resonant type switching power apparatus.

The commercial power supply applied between the terminal X and the terminal Y is rectified in the full-wave rectification circuit 20 and smoothed in the ripple filter circuit 27. Then, the rectified and smoothed power is supplied via the start-up resistor 28 to the VCC terminal T1 of the package S as a power voltage Vcc.

When the power voltage Vcc is less than or equal to the threshold voltage UVL, the low-voltage detecting circuit 11 outputs a stop signal to prevent the oscillation circuit 3 from generating a saw-like signal. When the power voltage Vcc gradually increases and exceeds the threshold voltage UVH, the low-voltage detecting circuit 11 outputs a stop reset signal to cause the oscillation circuit 3 to generate a saw-like signal. Furthermore, in response to the power voltage Vcc applied to the Vcc terminal T1, the reference voltage generating circuit 64 outputs the lowest reference voltage $Vref_1$ to the oscillation level comparison circuit 15.

The saw-like signal is input to the oscillation edge circuit 8 in which the saw-like signal is converted into a pulse signal. The pulse signal is then sent to the latch circuit 9. In this case, the high-voltage detecting circuit 12 does not produce a stop signal. The pulse signal is input via the latch circuit 9 and the buffer 17 to the set terminal S of the pulse width modulation circuit 16.

When the pulse signal is input to the set terminal S of the pulse width modulation circuit 16, the pulse width modulation circuit 16 produces a high-level output signal from its output terminal Q. In this case, the driver circuit 18 is in an operating condition because a stop reset signal is currently input from the low-voltage detecting circuit 11. Accordingly, the driver circuit 18 can amplify the signal of the output terminal Q of the pulse width modulation circuit 16 and can apply a high-level signal $S_{DRV}$ to the gate electrode of the MOSFET 1 and to the gate electrode of the MOSFET 2.

When the gate potential rises to a high level, each of the MOSFET 1 and the MOSFET 2 is brought into an ON state. Thus, the current Id flows from the drain electrode to the source electrode of the MOSFET 1 via the primary winding 23 of the transducer. A drain-source voltage $V_{DS}$ reduces as shown in FIG. 6. The secondary winding 24 of the transducer 22 produces a secondary voltage in accordance with electric power applied to the primary winding 23 of the transducer 22. The secondary voltage is rectified and smoothed by the diode 31 and the capacitor 32, and is applied to the load connected between the terminal M and the terminal N. The current Id gradually increases after the MOSFET 1 has turned into an ON state, as shown in FIG. 6. The gradient of the current Id is dependent on an Inductance value of the primary winding.

The voltage increase of the terminal M, occurring in the load, is divided by the resistors 41 and 42 and is used to gradually increase the base voltage of the transistor 40. In accordance with increasing base voltage of the transistor 40, the current flowing across the light-emitting diode 34 increases. Thus, the light-emitting diode 34 gradually increases the intensity of light emission. The resistance value of the photo-transistor 35 decreases. As a result, as shown in FIG. 6, the feedback voltage $V_{FB}$ applied to the FB terminal T3 increases in accordance with the increasing voltage applied to the load.

The feedback voltage $V_{FB}$ is fed via the FB terminal T3 to the oscillation level comparison circuit 15. The oscillation level comparison circuit 15 outputs a reset signal to the reset terminal R of the pulse width modulation circuit 16 when a detection voltage $V_{COM}$ exceeds the reference voltage Vref (i.e., reference voltage $Vref_1$ in an initial condition). The detection voltage $V_{COM}$ includes the feedback voltage $V_{FB}$ and a voltage applied via the MOSFET 2. As a result, the pulse width modulation circuit 16 produces a low-level output signal from its output terminal Q. The driver circuit 18 produces a low-level gate signal $S_{DRV}$ in accordance with a change at the output terminal Q of the pulse width modulation circuit 16. The change at the output terminal Q of the pulse width modulation circuit 16 is transmitted via the driver circuit 18 to the gate electrode of the MOSFET 1 and to the gate electrode of the MOSFET 2. Thus, both of the MOSFET 1 and the MOSFET 2 are brought into an OFF state. No electric power is supplied to the primary winding 23 of the transducer 22.

When the gate signal $S_{DRV}$ falls to a low level, the gate edge circuit 60 produces the gate-off edge signal $S_{GOF}$ as a pulse signal decreasing to a low level in synchronism with the timing the gate signal $S_{DRV}$ falling from a high level to a low level, as shown in FIG. 2.

The ratio of the voltage generated from the auxiliary winding 25 and the voltage generated from the secondary winding 24 is equal to the winding ratio. When all of the electric power from the primary winding 23 is completely transmitted to the secondary winding 24, the drain-source voltage of the MOSFET 1 causes free oscillation and attenuates with a cosine waveform due to the resonant function of the voltage resonant capacitor 29. The auxiliary winding 25 generates a voltage having a waveform similar to that of the drain-source voltage of the MOSFET 1. The resistor 45 and a capacitor CO, provided between the TRG terminal and the GND terminal, can integrate the voltage of the auxiliary winding 25 and, as a result, generate the trigger signal $S_{TRG}$ shown in FIG. 6. The trigger signal $S_{TRG}$ is input to the TRG terminal T2.

The edge detecting circuit 6 receives the trigger signal $S_{TRG}$ from the TRG terminal T2 and converts it into a pulse signal which is transmitted to the fixing circuit 4 and to the level determining circuit 62.

The level determining circuit 62 receives the trigger signal $S_{TRG}$ and determines whether the trigger signal $S_{TRG}$ is greater than or equal to a predetermined threshold voltage. As shown in FIG. 2, the output signal $S_2$ falls from a high level to a low level in synchronism with the timing the trigger signal $S_{TRG}$ transfers from a state not less than the threshold voltage $V_{TH1}$ and not greater than the threshold voltage Vp to a state less than the threshold voltage $V_{TH1}$ or to a state exceeding the threshold voltage Vp.

The output signal $S_1$ turns from a high level to low level in synchronism with the timing the trigger signal $S_{TRG}$ transfers from a state not less than the threshold voltage $V_{TH2}$ and not greater than the threshold voltage Vp to a state less than the threshold voltage $V_{TH2}$ or to a state exceeding the threshold voltage Vp.

For example, the threshold voltage $V_{TH1}$ can be set to 1.9V. The threshold voltage $V_{TH2}$ can be set to 3.8V. The threshold voltage Vp can be set to Vcc-1.5V.

The reference voltage generating circuit 64, as shown in FIG. 6, produces the reference voltage Vref in accordance with the output signals $S_1$ and $S_2$. As described previously, in a condition that the output signal $S_2$ is maintained at a high level, i.e., in a condition that the trigger signal $S_{TRG}$ is less than the threshold voltage $V_{TH1}$, the reference voltage generating circuit 64 produces the reference voltage $Vref_1$= (R2×Vx)/(R1+R2).

When the level determining circuit 62 maintains a low-level output signal $S_2$ and a high-level output signal $S_1$, i.e., in a condition that the trigger signal $S_{TRG}$ is greater than or equal to the threshold voltage $V_{TH1}$ and less than the threshold voltage $V_{TH2}$, the source and drain electrodes of the transistor 85 are opened at the timing the trigger signal $S_{TRG}$ decreases and the source and drain electrodes of the transistor 86 are short-circuited. Accordingly, the reference voltage generating circuit 64 produces the reference voltage $Vref_2$=((R2+R3)×Vx))/(R1+R2+R3).

When the output signals $S_1$ and $S_2$ are both at a low level, i.e., when the trigger signal $S_{TRG}$ is greater than or equal to the threshold voltage $V_{TH2}$ and less than the threshold voltage Vp, the source and drain electrodes of respective transistors 85 and 86 are opened and accordingly the reference voltage generating circuit 64 produces the reference $Vref_3$=((R2+R3+R4)×Vx))/(R1+R2+R3+R4) at the timing the trigger signal $S_{TRG}$ decreases.

Furthermore, when the trigger signal $S_{TRG}$ is maintained in a state greater than or equal to the threshold voltage Vp for a relatively short time equivalent to 1 cycle, the source and drain electrodes of respective transistors 85 and 86 are opened at the timing the trigger signal $S_{TRG}$ increases.

Accordingly, the reference voltage generating circuit 64 produces the reference voltage $Vref_3$=((R2+R3+R4)×Vx))/ (R1+R2+R3+R4) at the timing the trigger signal $S_{TRG}$ increases. Next, until the timing the MOSFET 1 turns into an OFF state, i.e., until the gate-off edge signal $S_{GOF}$ turns into a low level, the reference voltage Vref can be set in the oscillation level comparison circuit 15.

For example, setting practical values of R1=200 kΩ, R2=50 kΩ, R3=100 kΩ, R4=300 kΩ, and Vx=5.7V in FIG. 4 provides practical reference voltage values of $Vref_1$=approximately 1.14V, $Vref_2$=approximately 2.44V, and $Vref_3$=approximately 3.95V.

As described above, the reference voltage Vref to be used in the next switching cycle can be set in a condition that the MOSFET 1 and the MOSFET 2 are both in an OFF state and can be continuously maintained until the MOSFET 1 switches from an ON state to an OFF state.

Furthermore, the auxiliary winding 25 generates a voltage proportional to the secondary voltage in accordance with a winding ratio between the auxiliary winding 25 and the secondary winding 24. The reference voltage Vref in the next cycle can be set stepwise based on the trigger signal $S_{TRG}$ generated by a reverse electromotive voltage. For example, the reference voltage Vref increases stepwise in a starting period as shown in FIG. 6. Thus, it becomes possible to gradually increase the electric power supplied to the load which is generally referred to as soft start processing.

The quasi resonant type switching power supplying unit 200 can set the reference voltage Vref without relying on any external capacitor. Thus, the effort previously required for connecting an external capacitor to the device is no longer required. The manufacturing time can be shortened and manufacturing costs can be reduced.

Furthermore, in the event that the load is short-circuited, the reference voltage Vref can be set to the lowest level. Accordingly, the effect of protecting the device from overcurrent or overload can be enhanced.

Furthermore, when the trigger signal $S_{TRG}$ is maintained in a state greater than or equal to the threshold voltage Vp for a period of time longer than 1 cycle, the output signals $S_1$ and $S_2$ are maintained at a high level and the reference voltage $Vref_1$=(R2×Vx)/(R1+R2) can be produced. Accordingly, the intermittent oscillation and other processing can be realized by maintaining the trigger signal $S_{TRG}$ in a state greater than or equal to the threshold voltage Vp.

On the other hand, the fixing circuit 4 applies a logic operation to an oscillation limiting signal generated therein and the pulse signal input from the edge detecting circuit 6, and outputs a charge control signal when both signals are in a low level. The MOSFET 5 turns into an ON state in response to a charge voltage, and the capacitor C is charged via the MOSFET 5. Thus, the gradient of a saw-like signal increases.

The oscillation edge circuit 8 receives the saw-like signal produced from the oscillation circuit 3 and converts it into a pulse signal which is input into the set terminal S of the pulse width modulation circuit 16. In response to the pulse signal, the pulse width modulation circuit 16 generates a high-level output signal from its output terminal Q. The high-level output signal, produced from the output terminal Q of the pulse width modulation circuit 16, is supplied via the driver circuit 18 to the gate electrode of the MOSFET 1 and to the gate electrode of the MOSFET 2. Thus, both the MOSFET 1 and the MOSFET 2 are turned ON again.

As described above, the reference voltage Vref can be set stepwise based on the trigger signal $S_{TRG}$ corresponding to the reverse electromotive voltage generated from the auxiliary winding 25 which is electromagnetically connected with the primary winding 23 when the MOSFET 1 and the MOSFET 2 are in an OFF state. Then, the conditions of the MOSFET 1 and the MOSFET 2 are switched back to an ON state.

In such a case, when the detection voltage $V_{COM}$ including the feedback voltage $V_{FB}$ (corresponding to an electric power supplied to the load) exceeds the reference voltage Vref, both of the MOSFET 1 and the MOSFET 2 are switched to an OFF state. By repeating the above-described switching operations, electric power can be supplied to the load.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

What is claimed is:

1. A quasi resonant type switching power supplying unit including a switching element that causes repetitive switching to intermittently supply electric power to a primary winding of an external transducer, thereby supplying electric power to a load connected to a secondary winding of the transducer which is electromagnetically connected with the primary winding, comprising:
   an overcurrent limiting circuit that receives a reverse electromotive voltage generated from an auxiliary winding of the transducer which is electromagnetically connected with the primary winding when the switching element is in an OFF state, and produces a reference voltage stepwise based on the reverse electromotive voltage; and
   an oscillation level comparison circuit that receives a detection voltage corresponding to the electric power supplied to the load, and produces a control signal that brings the switching element into an OFF state when a voltage corresponding to the detection voltage exceeds the reference voltage.

2. The quasi resonant type switching power supplying unit according to claim 1, wherein the overcurrent limiting circuit renews the reference voltage in response to every switching of the switching element.

3. The quasi resonant type switching power supplying unit according to claim 2, wherein the overcurrent limiting circuit includes a plurality of serially connected resistance elements and a switching element capable of short-circuiting both end terminals of at least one of the resistance elements in accordance with the reverse electromotive voltage.

4. The quasi resonant type switching power supplying unit according to claim 2, wherein the overcurrent limiting circuit produces a lowest reference voltage when the load is in a short-circuited condition.

5. The quasi resonant type switching power supplying unit according to claim 1, wherein the overcurrent limiting circuit includes a plurality of serially connected resistance elements and a switching element capable of short-circuiting both end terminals of at least one of the resistance elements in accordance with the reverse electromotive voltage.

6. The quasi resonant type switching power supplying unit according to claim 1, wherein the overcurrent limiting circuit produces a lowest reference voltage when the load is in a short-circuited condition.

7. The quasi resonant type switching power supplying unit according to claim 6, wherein the overcurrent limiting circuit includes a plurality of serially connected resistance elements and a switching element capable of short-circuiting both end terminals of at least one of the resistance elements in accordance with the reverse electromotive voltage.

8. A quasi resonant type switching power apparatus comprising a quasi resonant type switching power supplying unit and a transducer, wherein the quasi resonant type switching power supplying unit includes a switching element that causes repetitive switching to intermittently supply electric power to the transducer, and the transducer includes a primary winding connected to the switching element, a secondary winding electromagnetically connected with the primary winding to supply electric power to a load, and an auxiliary winding electromagnetically connected with the primary winding,
   wherein the quasi resonant type switching power supplying unit comprises:
   an overcurrent limiting circuit that receives a reverse electromotive voltage generated from the auxiliary winding when the switching element is in an OFF state, and produces a reference voltage stepwise based on the reverse electromotive voltage; and
   an oscillation level comparison circuit that receives a detection voltage corresponding to the electric power supplied to the load, and produces a control signal that brings the switching element into an OFF state when a voltage corresponding to the detection voltage exceeds the reference voltage.

9. A quasi resonant type switching power apparatus comprising a quasi resonant type switching power supplying unit and a transducer, wherein the quasi resonant type switching power supplying unit includes a switching element that causes repetitive switching to intermittently supply electric power to the transducer, and the transducer includes a primary winding connected to the switching element, a secondary winding electromagnetically connected with the primary winding to supply electric power to a load, and an auxiliary winding electromagnetically connected with the primary winding,
   wherein the quasi resonant type switching power supplying unit comprises:
   an overcurrent limiting circuit that receives a reverse electromotive voltage generated from the auxiliary winding when the switching element is in an OFF state, and produces a reference voltage stepwise based on the reverse electromotive voltage; and
   an oscillation level comparison circuit that receives a detection voltage corresponding to the electric power supplied to the load, and produces a control signal that brings the switching element into an OFF state when a voltage corresponding to the detection voltage exceeds the reference voltage,
   wherein the overcurrent limiting circuit renews the reference voltage in response to every switching of the switching element.

10. A quasi resonant type switching power apparatus comprising a quasi resonant type switching power supplying unit and a transducer, wherein the quasi resonant type switching power supplying unit includes a switching element that causes repetitive switching to intermittently supply electric power to the transducer, and the transducer includes a primary winding connected to the switching element, a secondary winding electromagnetically connected with the primary winding to supply electric power to a load, and an auxiliary winding electromagnetically connected with the primary winding,
   wherein the quasi resonant type switching power supplying unit comprises:
   an overcurrent limiting circuit that receives a reverse electromotive voltage generated from the auxiliary winding when the switching element is in an OFF state, and produces a reference voltage stepwise based on the reverse electromotive voltage; and
   an oscillation level comparison circuit that receives a detection voltage corresponding to the electric power supplied to the load, and produces a control signal that brings the switching element into an OFF state when a voltage corresponding to the detection voltage exceeds the reference voltage,
   wherein the overcurrent limiting circuit produces a lowest reference voltage when the load is in a short-circuited condition.

11. A quasi resonant type switching power apparatus comprising a quasi resonant type switching power supplying unit and a transducer, wherein the quasi resonant type switching power supplying unit includes a switching element that causes repetitive switching to intermittently supply electric power to the transducer, and the transducer includes a primary winding connected to the switching element, a secondary winding electromagnetically connected with the primary winding to supply electric power to a load, and an auxiliary winding electromagnetically connected with the primary winding, wherein the quasi resonant type switching power supplying unit comprises:

an overcurrent limiting circuit that receives a reverse electromotive voltage generated from the auxiliary winding when the switching element is in an OFF state, and produces a reference voltage stepwise based on the reverse electromotive voltage; and an oscillation level comparison circuit that receives a detection voltage corresponding to the electric power supplied to the load, and produces a control signal that brings the switching element into an OFF state when a voltage corresponding to the detection voltage exceeds the reference voltage, wherein the overcurrent limiting circuit renews the reference voltage in response to every switching of the switching element and produces a lowest reference voltage when the load is in a short-circuited condition.

* * * * *